United States Patent [19]

Grant

[11] 3,792,362

[45] Feb. 12, 1974

[54] CLOCK APPARATUS AND DATA PROCESSING SYSTEM

[75] Inventor: Glenn D. Grant, San Jose, Calif.

[73] Assignee: Amdahl Corporation, Sunnyvale, Calif.

[22] Filed: Oct. 30, 1972

[21] Appl. No.: 302,222

[52] U.S. Cl. ..................... 328/72, 328/55, 328/105, 307/215

[51] Int. Cl. ........................................... H03k 5/159

[58] Field of Search ....... 328/63, 72, 103, 104, 105; 307/215

[56] References Cited

UNITED STATES PATENTS 3,028,552 4/1962 Hahs ................................ 328/63 X 3,327,299 6/1967 Johnson ......................... 328/133 X 3,372,375 3/1968 Lem ................................ 328/104 X

*Primary Examiner*—John S. Heyman

*Attorney, Agent, or Firm*—Flehr, Hohbach, Test, Albritton & Herbert

[57] ABSTRACT

Disclosed is a clock apparatus for use in a data processing system. The clock pulse width is made substantially equal to the maximum latch delay (MLD) plus the clock skew (CS) for obtaining the minimum number of circuits relative to the maximum clock frequency.

13 Claims, 7 Drawing Figures

CLOCK APPARATUS AND DATA PROCESSING SYSTEM

CROSS REFERENCE TO RELATED APPLICATIONS

1. DATA PROCESSING SYSTEM, Ser. No. 302,221, filed Oct. 30, 1972, invented by Gene M. Amdahl, Glenn D. Grant and Robert M. Maier, assigned to Amdahl Corporation.

2. RIGHT AND LEFT SHIFTER AND METHOD IN A DATA PROCESSING SYSTEM, Ser. No. 302,227, filed Oct. 30, 1972, invented by Gene M. Amdahl, Michael R. Clements and Lyle C. Topham, assigned to Amdahl Corporation.

3. DUAL OUTPUT ADDER AND METHOD OF ADDITION FOR CONCURRENTLY FORMING THE DIFFERENCES A-B AND B-A, Ser. No. 302,225, filed Oct. 30, 1972, invented by Ulrich Spannagel, assigned to Amdahl Corporation.

BACKGROUND OF THE INVENTION

The present invention relates to the field of clocking systems and specifically to clocking systems used in high speed data processing systems.

In data processing systems, the clock is the primary timing control for many operations throughout the system. Prior art clocking systems have generally been of the edge-trigger type or of the threshold-trigger type.

Edge-triggered clocking systems function to switch information on the leading or trailing edge of clock pulses and are often called AC clocks. Edge-triggered devices, however, have not proved entirely adequate because of their noise sensitivity, their poor frequency response and because of the difficulty in controlling the exact timing of the leading and trailing edges. Threshold-triggered clocking systems function to switch information on the DC level of the clock pulses and are often called DC clocks. Threshold-triggered devices have the requirement that the signal be present for a minimum period in order that sufficient energy exists at the input so as to switch the level of the output. That minimum period is typically defined for the shortest duration switching function within the system. Since a latch circuit is typically the shortest duration storing function which is performed in a data processing system, the period of time, called the maximum latch delay (MLD), allocated for switching latches is one parameter used to characterize the clock apparatus of the data processing system. Other parameters employed are clock skew (CS), maximum data path delay (Dmax) and minimum data path delay (Dmin).

The maximum latch delay (MLD) for which one clock pulse must occur is defined as the pulse width of, that is the amount of time between the leading and trailing edge of, a clock signal which is sufficient to cause a latch circuit, or its equivalent, receiving an input data signal to store that data signal and to provide a reliable, responsive output data signal.

Clock skew is defined as the maximum difference between the leading edges of any two clock pulses which define the same cycle of the system as measured at the input of latches, or their equivalent, anywhere in the system. Clock skew results from variations in electrical parameters of the different paths associated with delivering clock pulses throughout the system.

The maximum data path delay (Dmax) is defined as the maximum period which a data path can use to deliver a responsive output data signal after an input data signal is gated into the data path. The minimum data path delay (Dmin) is defined as the minimum period which a data path must use to deliver a responsive output signal after an input signal is gated into the data path. The maximum and minimum data path delays are controlled, to a significant degree, by the number of levels of logic, by variations in circuit parameters within each logic level, and by the physical array of the data paths.

In order to minimize the number of circuits required in data processing systems, clock systems can be designed with clock signals having a pulse width equal to the maximum latch delay. With the pulse width equal to the maximum latch delay, the system requires that the minimum data path delay (Dmin) include a delay at least equal to the clock skew. Failure of any data path to include such a delay typically results in race conditions within one clock pulse period whereby data is, at times, erroneously gated through twice for one clock pulse. While some prior art high speed clocking systems have been effective in reducing circuit cost by clock system design, they frequently have done so at the expense of not achieving maximum clock frequency and therefore maximum performance. The present invention optimizes both cost and performance through appropriate selection of the clock pulse width.

SUMMARY OF THE INVENTION

The present invention is a clock apparatus and method for a high speed data processing system. The pulse width of the clock signal is selected greater than the maximum latch delay so as to include a portion of or all of the clock skew. In one embodiment, the clock pulse width is made substantially equal to the maximum latch delay plus the clock skew so as to achieve the highest clock frequency with the fewest number of circuits.

In another embodiment, the clock pulse width is selected to be always greater than the maximum latch delay plus the clock skew so as to ensure that the data processing system may be designed to always operate at the maximum frequency.

In accordance with the above summary, the present invention achieves the objective of providing an improved clock apparatus for a data processing system wherein performance and cost are optimized by appropriate selection of the clock pulse width.

Additional objects and features of the invention will appear from the description in which the preferred embodiments of the invention have been set forth in detail in conjunction with the drawings.

BIREF DESCRIPTION OF THE DRAWINGS

DESCRIPTION OF THE PREFERRED EMBODIMENTS

OVERALL SYSTEM

Figure 1:
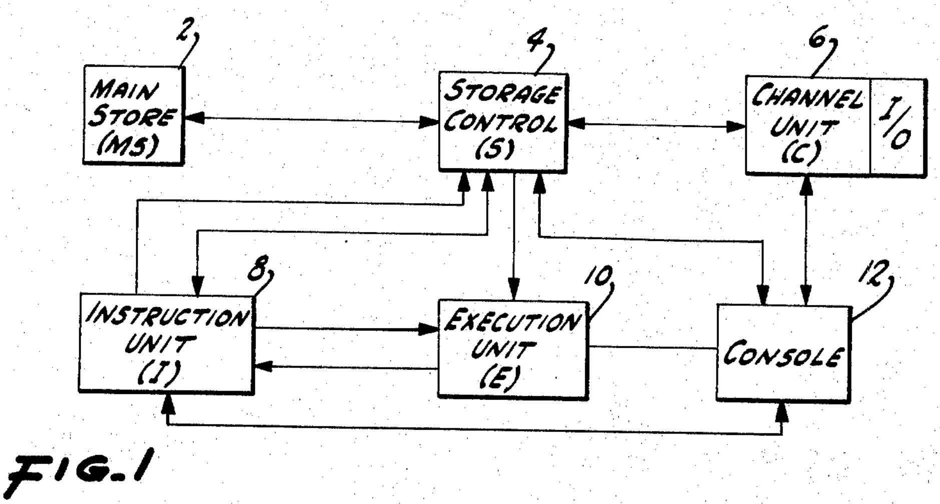
FIG. 1 depicts a block diagram of a basic environmental system which employs the clock apparatus of the present invention.

In FIG. 1, a basic environmental data processing system is shown which is suitable for employing the apparatus and method of the present invention. Briefly, that system includes a main store 2, a storage control unit 4, an instruction unit 8, an execution unit 10, a channel unit 6 with associated I/O, and a console 12. In accordance with well known principles, the data processing system of FIG. 1 operates under control of a stored program of instructions. Typically, instructions and the data upon which the instructions operate are introduced from the I/O equivalent via the channel unit 6 through the storage control unit 4 into the main store 2. From the main store 2, instructions are fetched by the instruction unit 8 through the storage control 4, and are decoded so as to control the execution within the execution unit 10. Execution unit 10 executes instructions decoded in the instruction unit 8 and operates upon data communicated to the execution unit from the appropriate places in the system.

Execution unit 10 includes an adder for executing certain instructions of the system of FIG. 1, particularly instructions requiring the addition of operands in accordance with the rules of exponent arithmetic. By way of general background and for specific datails relating to the operation of the basic environmental system of FIG. 1, reference is made to the above identified application Ser. No. 302,221, filed Oct. 30, 1972.

EXECUTION UNIT

Figure 2:
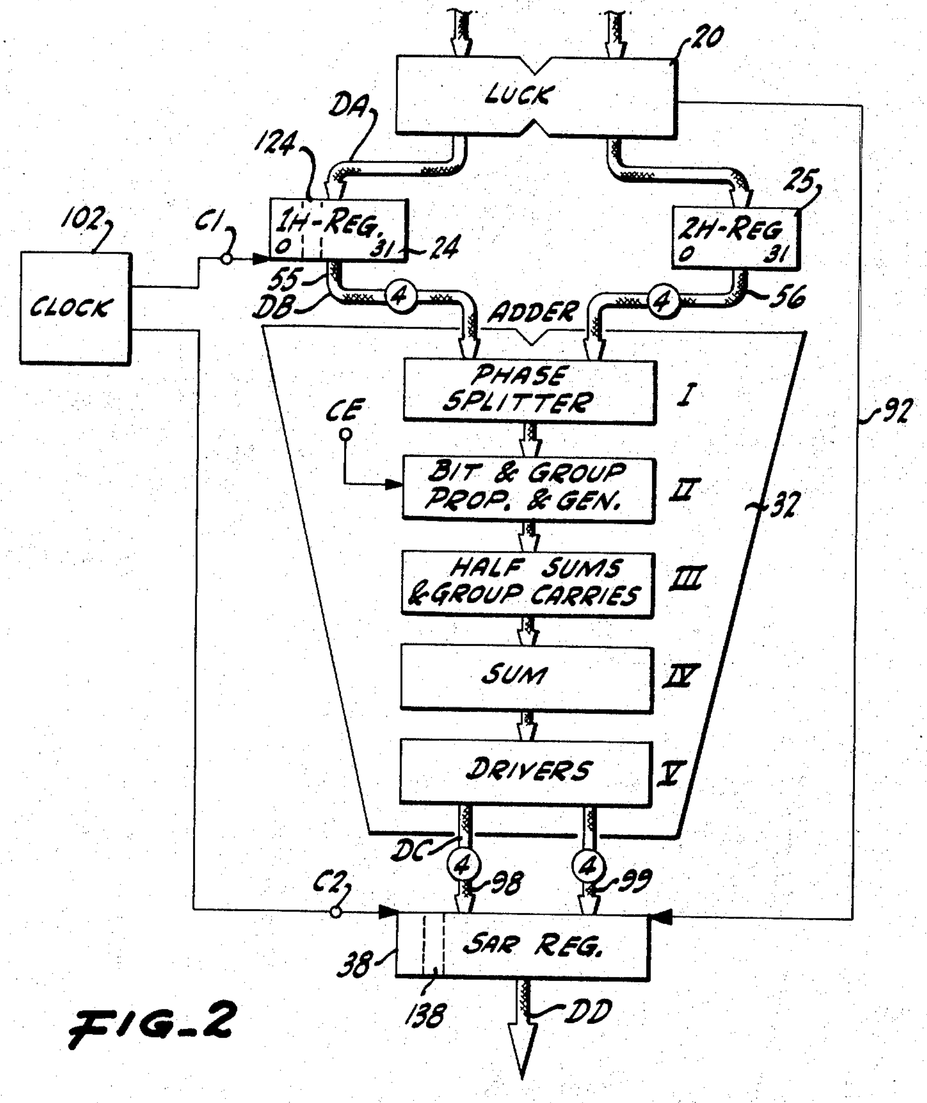
FIG. 2 depicts the data paths associated with an adder within the execution unit of the system of FIG. 1 and the manner in which the clock apparatus provides the timing for data transmitted through the adder.

In FIG. 2, the basic data paths, within the execution unit 10, are shown which are associated with the adder 32 of the present invention. Briefly, data to be added is communicated to the adder 32 through the LUCK 20 to the 1H register 24 and the 2H register 25.

While the 1H register 24 and the 2H register 25 are each 32 bits wide, labeled 0 through 31 in FIG. 2, only one half byte comprising 4 bits is added in connection with a representative example of the present invention. Specifically, the 1H and the 2H registers each store one word, equal to four 8 bit bytes of data. Only one of the four bytes in each register is described in connection with the present invention. Operand A is stored in the 1H register 24 in bit positions 4 through 7 which produce inputs *a*4 through *a*7. Similarly, operand B is stored in 2H register 25 in bit positions 4 through 7 which produce inputs *b*4 through *b*7. At an appropriate time in the cycle of the data processing system of FIG. 1, operands A and B are gated to the adder 32 of FIG. 2 and the difference A-B appears on the 4-bit output bus 99 while the difference B-A appears on the 4-bit output bus 98.

At an appropriate time within the cycle of the data processing system, a determination of whether the operand A is larger than the operand B or vice versa occurs. When that determination is made, a signal on line 92 selects the appropriate one of the output busses 98 or 99 for ingating the selected difference into the SAR register 38 for further use by the system of FIG. 1. The signal on line 92 is derived, in one embodiment, from LUCK unit 20 which performs logical comparisons. Alternatively, the line 92 may be derived from higher order bits of adder 32 when they are employed.

The execution unit 10 also includes a shifter for shifting the mantissa portions of operands A and B in response to the selected difference A-B or B-A in carrying out the exponent arithmetic alignment. Further details as to the shifter may be obtained from the above referenced application Ser. No. 302,227, filed Oct. 30, 1972.

ADDER

Referring to FIG. 2, adder 32 is comprised of five logic levels I through V and is of the carry propagate type. The level I LOGIC FORMS THE PLUS AND MINUS PHASES OF THE INPUT SIGNALS. Bit propagate and bit generate signals and group propagate and group generate signals are produced in the level II logic. In the level III logic, the signals from the second level are logically combined to form the half-sum signals and the group carry signals. In the level IV logic, the full sums are produced from the signals of the level III logic. The level V logic is a power level for the A-B difference and a power level and inverter for the B-A difference.

In FIG. 2, the data signal DA input to the 1H register 24 appears a short time after the clock signal C1 and is responsively latched into the 1H register 24 by clock signal C1, to provide the output data signal DB. The DB data signal from 1H register 24 is provided as an input on bus 55 to adder 32 where it is propagated through the five levels of logic I THROUGH V. After undergoing the data path delay, X, resulting from propagation through the five levels of adder 32, the data signal DB produces an output data signal DC on output bus 98, the data signal DC is latched into the SAR register 38 by the clock signal C2. The data signal DC latched into register 38 by clock signal C2 establishes a data signal DD as the output from register 38. The clock signals C1 and C2, which cause the data signals to be latched, are derived from the system clock 102.

Figure 3:
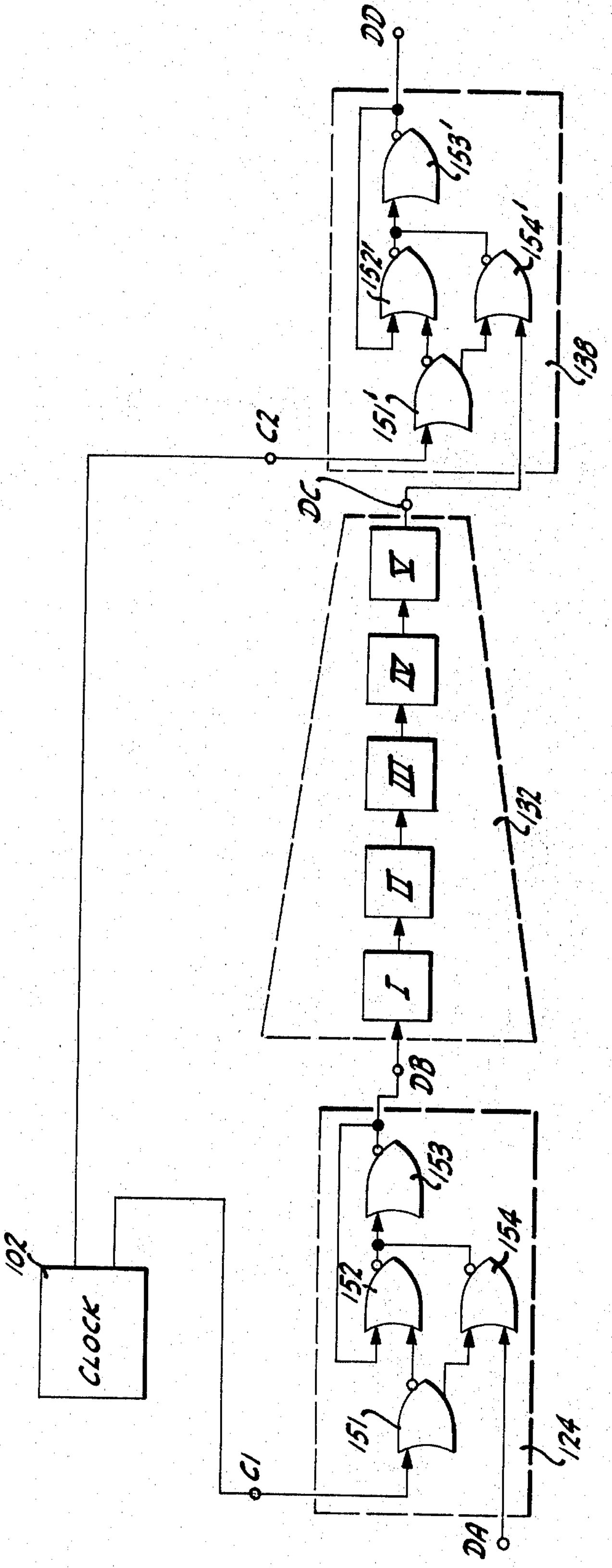
FIG. 3 depicts further details associated with the data and clock paths of the adder of FIG. 2.

Referring to FIG. 3, one stage of the 1H register 24 is shown as latch 124. Similarly, one stage of register 38 is shown as latch 138. The latch 124 has as an input the data signal DA and produces as an output the data signal DB.

Latch 124 includes the OR/NOR gates 151 through 154 which operate to perform the latch function. The DB output signal is connected as an input to the five stages of logic 132 which are a part of the adder 32 of FIG. 2. The stages 132 represent any five levels of logic through which the signal DB propagates in forming the output data signal DC. Specific details as to the data paths in adder 32 appear in the above-referenced application Ser. No. 302,225, filed Oct. 30, 1972.

The output data signal DC connects as an input to the latch 138 which is identical to the latch 124 where corresponding OR/NOR gates are indicated with corresponding primed reference numbers. The output from the latch gate 138 is the data signal DD.

CLOCK APPARATUS

Figure 6:
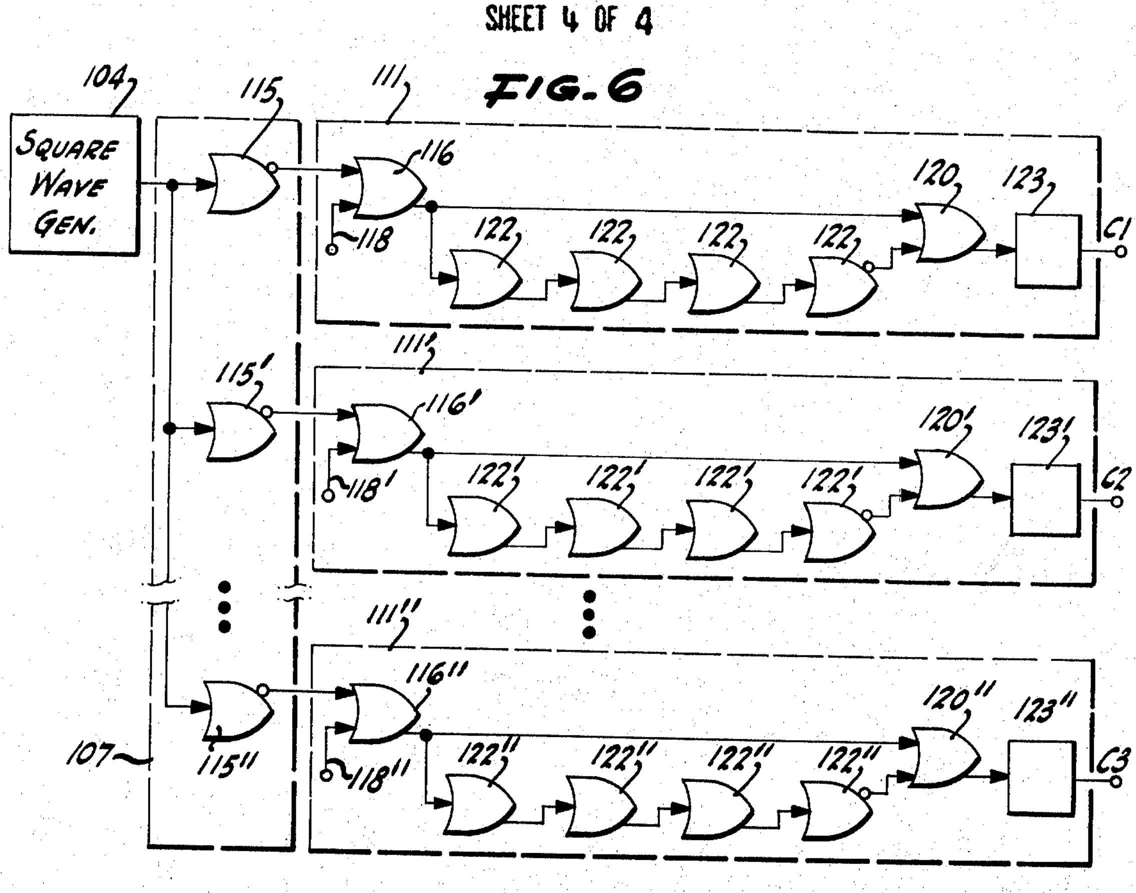
FIG. 6 depicts a clock apparatus for generating clock signals in accordance with the present invention.

In FIG. 6, the clock apparatus of the present invention is shown in connection with a representative portion of the data processing system. In the clock apparatus, square wave generator 104 is a conventional device for generating square waves and typically includes an oscillator and shaping circuits for squaring the output from the oscillator. Generator 104 produces a square wave output signal having a frequency F typically equal to 50 MHz and which, therefore, defines a system cycle time CT equal to 20 manoseconds. The output from generator 104 is input to a plurality of NOR gates 115, 115', and 115'' which together form a multichip carrier (MCC) distribution circuit 107. Each of the gates 115 feeds a separate one of the multichip carrier circuits 111, 111' and 111'', respectively, and specifically the NOR gates 116, 116' and 116'', respectively.

The NOR gates 116 each receive as their other input the inhibit lines 118, 118' and 118'' which function to inhibit the clock signal to all parts of the respective MCC circuit. The outputs from the NOR gates 116 are supplied directly to OR GATES -) AND ALSO TO A DELAY STRING OF FOUR OR/NOR gates 122 which in turn connect as a second input to the NOR gates 120. The gates 122 and the gates 120 function to modify the duty cycle of the square wave output from gates 116. The square wave output from the OR gates 116 is modified to a rectangular wave output from gates 120. The pulse width of the signals from gates 120 is selected, in accordance with one embodiment of the present invention, to equal the clock skew plus the maximum latch delay. By changing the number of gates in the string of gates 122, the pulse width of the clock signals is responsiely changed.

The output signals from the gates 120, 120' and 120'' are the clock signals CC1, CC2 and CC3, respectively, which supply the distributors 12, 123', and 123'', respectively. Each of the distributors 123 typically includes a plurality of OR/NOR gates like those in distribution circuit 107. The electrical characteristics of each of the circuit paths which generate the clock signals CC1, CC2 and CC3 may differ by the normal tolerance associated with high speed semiconductor technology. Furthermore, delay differences can be intentionally introduced by selecting the physical length with which the signals must travel in the distributors 123. By appropriate adjustment and testing of the distribution circuits 123, each of the clock signals can be finely tuned to establish the desired timing relationship and thereby insure that the maximum skew CS between any two clock signals is not exceeded.

CLOCK SIGNAL GENERATION

Figure 7:
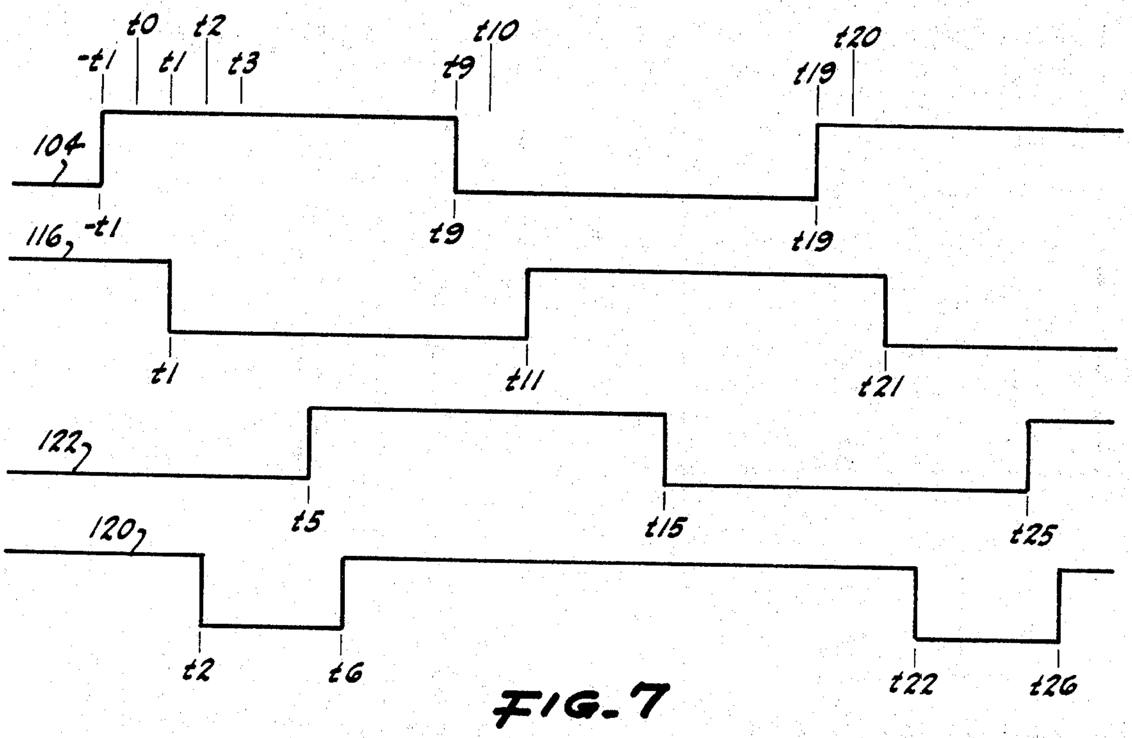
FIG. 7 depicts waveforms representative of the operation of the FIG. 6 clock apparatus.

Referring to FIG. 7, waveform 104 is representative of the output from square wave generator 104 and has a clock period defining the cycle time CT of the data processing system. The cycle time CT is equal to 1/F where F is the frequency of the oscillator in square wave generator 104. In FIG. 7, square wave 104 has a positive going transition at *-tl* followed by a negative going transition at t9 followed again by a positive going transition at t19. Waveform 104 is inverted and delayed in the gates 115 and is further delayed in the gates 116. Each of the gates 115 and 116 typically has a delay equal to one unit of *t* so that the combined delay for the gates 115 and 116 is two units of *t*. The waveform 116 in FIG. 7 is the inversion of waveform 104 delayed by two units of *t*. Accordingly, waveform 116 has a negative going transition at 1 followed by a positive going transition at t11 and again followed by a negative going transition at t21. Waveform 116 is also a square wave pulse. Waveform 116 is the input to the string of gates 122 which function to invert and delay waveform 116 by four units of *t* to produce the waveform 122. Waveform 122 has a positive going transition at *t5*, a negative going transition at t15, and a positive going transition at *t25*.

The OR gates 120 function to logically combine the waveforms 116 and the delayed and inverted waveform 122 to provide the clock signals 120 which have the desired pulse width. Waveform 120 is the logical OR function of the waveforms 116 and 122 delayed by one unit of t which is the nominal delay of the gates 120. Accordingly, waveform 120 has a negative going transition at t2 which is one unit of t after the negative going transition of waveform 116 at *t1*. Similarly, waveform 120 has a positive going transition at t6 which is one unit of t after the positive going transition of waveform 122 at *t5*. The negative going pulse of waveform 120 between *t2* and *t6* defines a first clock pulse and a first cycle of the data processing system and the negative going pulse between *t22* and *t26* defines the next cycle of the data processing system.

While it is intended that the waveform 120 in FIG. 7, representing the output from the gate 120 in FIG. 6, also represent the output from the gate 120' in FIG. 6, differences in the electrical parameters of the various circuits in FIG. 6 normally produce waveforms which are skewed relative to each other. As previously indicated, the distribution circuits 123, 123' and 123'' include means for adjusting the skew to ensure that the clock signals C1, C2 and C3 are all represented by waveform 120 in FIG. 7 within the limits of the maximum skew CS as will be described in further detail in connection with the wave forms of FIG. 5.

OPERATION

Figure 5:
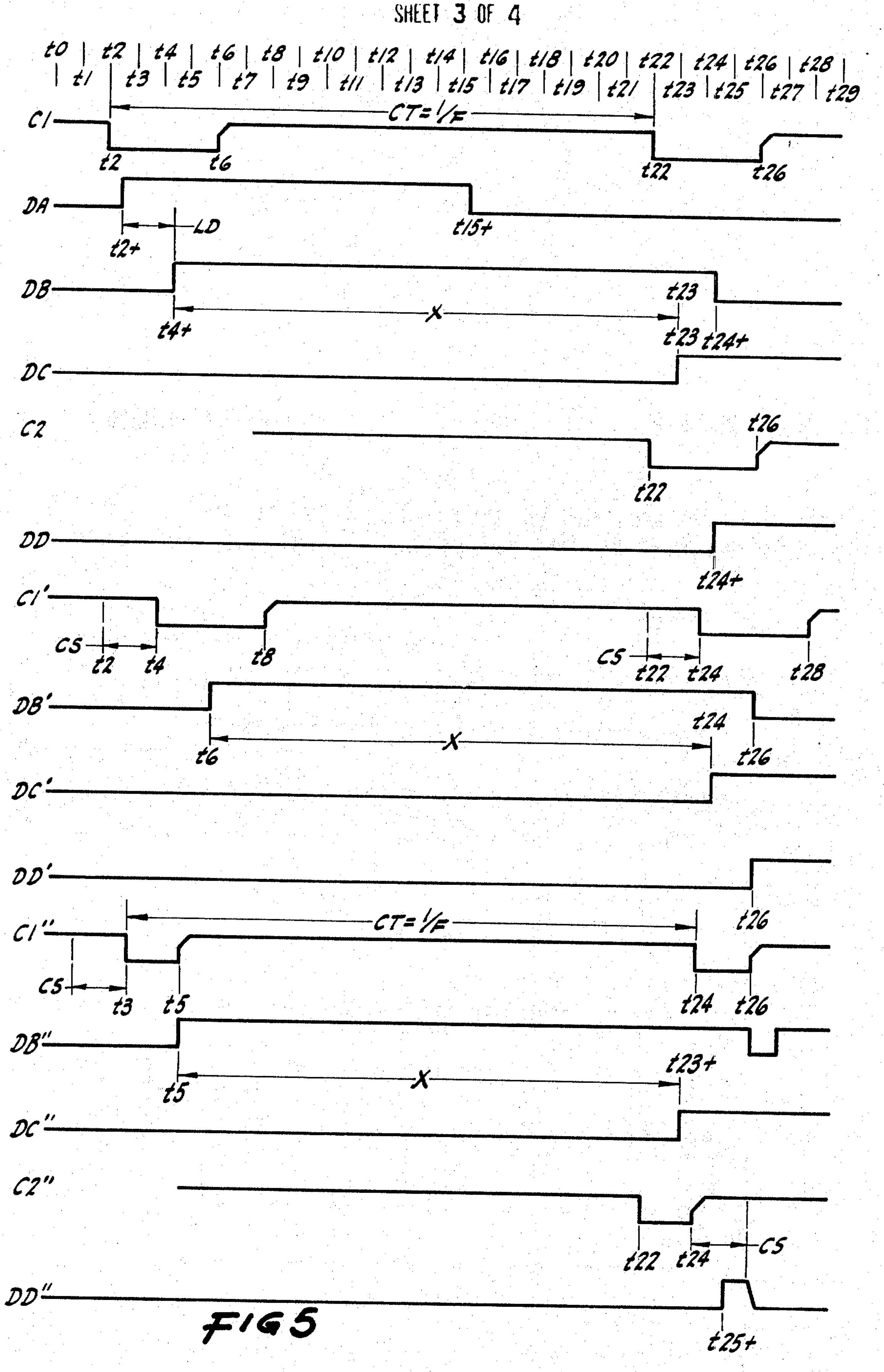
FIG. 5 depicts representative wave forms descriptive of the operations of the FIG. 3 clock system.

Referring to FIG. 5, the clock signals C1 and C2, derived from the clock apparatus of FIG. 6, function to control the transfer of data input to latch 124 through the byte adder data path 132 into the latch 138. The clock signal C1 latches the input data signal DA to form the output data signal DB which in turn is propagated through data path 132 to form the data signal DC which is latched by clock signal C2 to form the output data signal DD.

In FIG. 7, the clock signal C1 has a leading edge at *t2* and a trailing edge at *t6*. The clock period CT is equal to 1/F where the leading edge of the second clock pulse at *t22* appears 20 units of *t* away from the first leading edge at *t2*. Similarly, the trailing edge of the second clock pulse appears at t26 which is 20 units away from the first clock pulse trailing edge at *t6*.

The data signal DA goes from 0 to 1 at *t2+* sometime after the leading edge of the clock signal C1 at *t2* and prior to *t3*. With the data signal DA at the 1 level, and with the clock signal C1 at 0, the 1 level of the DA signal is propagated through to produce the data signal DB at a time *t4+*. The latch delay LD is the time between the transition of the data signal DA at *t2+* and the transition of the data signal DB at *t4+*. The latch delay LD is a function of the switching time of the NOR gates 151 through 154.

Latch 124 operates in a conventional manner. The 0 input to gate 151 produces a 1 input to the gate 152 and a 0 input to gate 154. The 0 input to gate 154 combined with the 1 of the data signal DA produces a 0 output from gate 154. The 0 output from gate 154 is combined with the 0 output of gate 152 to produce a 1 output from the gate 153. the two 1 inputs to the gate 152, derived from gate 153 and gate 151, establish the 0 output of gate 152. When the clock signal C1 goes to 0 at *t*6, the outputs from gate 151 reverse, providing a 1 input to gate 154.

When the clock signal C1 goes from 0 to 1 at *t*6, gate 151 provides a 0 to gate 152 and a 1 to gate 154. Gate 154 maintains its 0 output because of the 1 level of the data signal DA. Gate 152 maintains its 0 output because of the latching feedback from gate 153 to gate 152. Gate 152 maintains its 0 output even when the data signal DA changes levels from 1 to 0 as shown at some arbitrary time *t*22+. After *t*22+, gate 154 does not change its output from a 0 to a 1 because of the 1 input from gate 151. After *t*22, the clock signal C1 goes from 1 to a 0, thereby switching the output of gate 151 and the input to gate 154 to a 0, thereby providing a 1 output from gate 154. The 1 output from gate 154 combined with the 0 output of gate 152 provide a 0 output from gate 153 recording the change in the data signal DB at *t*24+.

The data signal DB having a 0 to 1 transition at t4 is propagated through the data path 132. Data path 132 has a data path delay Xof approximately 19 units of *t*. The data signal DC has a 0 to 1 transition at t23 which is the data signal input to the latch 138.

Because the clock signal C2 had a 1 to 0 transition at *t*22 and was, therefore, a 0 when the data signal DC went positive at *t*23, latch 138 functions to immediately latch the data signal DC and cause a 0 to 1 transition in the output data signal DD at time *t*24+. The latching of the data signal DC to establish the data signal DD is analogous to the latching of the data signal DA to establish the data signal DB. The period between *t*23 and the latching of the data signal DD at *t*24+ is the latch delay for latch 138. The latch delays for latches 124 and 138 are variables resulting from variations in the electrical parameters of the system as previously discussed. In general, the latch delay LD for any latch within the data processing system, of which latches 124 and 138 are typical, is designed not to exceed a value defined as the maximum latch delay (MLD).

The data path delay X for the data path 132 is also a variable for the same reasons that the latch delays are variables. The data path delay X is designed to be less than a maximum data path delay Dmax and greater than a minimum data path delay Dmin.

In order to avoid a double propagation of data through a latch and a dta path during a single clock pulse, the minimum data path delay Dmin must exceed the clock pulse width, CPW, plus the clock skew, CS. Also, in order to ensure that data may be transferred through a first latch by a first clock pulse down a data path and latched in a second latch by the next clock pulse, the maximum data path delay Dmax must be less than the clock period CT if CPW ≥ MLD+CS otherwise Dmax ≤ CT-CS where CT is the cycle time.

In designing and manufacturing the data processing system, techniques are employed to ensure that every latch in the system is operable with a delay which does not exceed the maximum latch delay MLD. Similarly, each of the data paths is designed to have a delay which exceeds the minimum data path delay Dmin and which does not exceed the maximum data path delay Dmax. One significant factor controlling the data path delay is the number of levels of logic in the data path. In order to meet the requirement that the minimum data path delay Dmin exceed the maximum latch delay MLD, additional circuits are frequently added solely for the purpose of adding additional delay to the data path. While this addition of circuits satisfies the minimum delay requirement, that addition by increasing the number of circuits also increases the cost of the data processing system. Relatively long periods of delay may be established between two clock pulses by latch circuits which are latched by early or late clock pulses which are out of phase with the principal clock pulse C1 and C2 which operate to control the transfer of data.

In the above discussion of FIG. 5, the assumption was made that the clock signals C1 and C2 were in phase and that, therefore, the circuit parameters from the master clock signals described in connection with FIGS. 6 and 7 were in phase and had no skew.

Referring again to FIG. 7, the clock signal C1′ applied to the C1 terminal of FIG. 3 is skewed relative to the clock signal C2 applied to the C2 terminal of FIG. 3. The clock signal C1′ has a negative going transition at *t*4 which is two units of *t* later than the clock signal C1. For purposes of explanation, the skew between clock signal C1 and clock signal C1′ has been selected as the maximum value CS. The clock skew is controlled within the data processing system to ensure that no two clock signals as measured at the input to latches, or equivalent points in the system, are separated by a value greater than the maximum clock skew CS.

For the same input data signal DA, the clock signal C1′ having a transition at t4 causes the data signal DB′ to be latched to a 1 at *t*6. In this example, the data path delay X is assumed the same as in the previous example so that the data signal DC′ transition occurs at *t*24+. The clock signal C2 thereafter causes the data signal DD′ to be latched at t26.

The pulse width for each of the clock signals C1, C1′ and C2 is equal to approximately four units of *t*. Also, the maximum clock skew CS and the maximum latch delay MLD each also are equal to approximately two units of *t*. Under these typical conditions, the data signal DA was appropriately latched and propagated to form the output data signals DD and DD′ without or with skew, respectively. Note that in both of those examples the clock pulse width CPW was substantially equal to the maximum latch delay MLD plus the maximum clock skew CS.

In a third example, still referring to FIG. 5, clock signals C1″ and C2″ are assumed to have the same period CT as in the previous two examples but are assumed to have a pulse width which is equal to the maximum latch delay MLD, which in the examples given, is approximately two units of t. Specifically, clock signal C1″ has a negative going transition at *t*3. and a positive going transition at *t*5. For the same input data signal DA as before, the data signal DB″ is latched at *t*5.

The data signal DB″ latched at *t*5 is propagated through the same data path delay X to form the transition in the data signal DC″ at *t*23+. The clock signal C2″ has the same initial transition at *t*22 as the first clock signal C2 but is only two units of *t* long so that it terminates at *t*24. Since the data signal DC″ has a transition at $t23+$, the duration from $t23+$ to $t24$ does not equal the maximum latch delay MLD so that it canot be gauranteed that every latch in the data processing system would be capable of latching the data signal DC''. Accordingly, the data signal DD'' is shown with an initial excursion toward latching at $t23+$ but there is a failure to latch as indicated by the signal after $t24+$.

The clock signals C1'' and C2'' are skewed the maximum amount CS permissible within the data processing system. Under these conditions, the data input signal DA is not properly latched and propagated to form the desired latch level in the output data signal DD''. In order to ensure that the output data signal DD'' is properly latched after $t25+$, while still retaining a clock pulse width of approximately two units of $t$ (which is equal to the maximum latch delay MLD), the clock period CT must be increased so that the leading edge of the clock signal C2'' occurs at a later time, for example, some time after $t24$. An increase in the clock period CT, however, causes a decrease in the frequency f of the clock cycle which decreases thereby the frequency of operation of the data processing system. To operate the data processing system at a lower frequency undesirably degrades the performance of the data processing system.

While the choice of the clock pulse width in the double prime example is detrimental in that it requires decreasing the clock frequency, it is beneficial in that it allows the minimum data path delay Dmin to be a shorter duration.

As previously discussed, the minimum data path delay must exceed the clock pulse width so that the more narrow the pulse width, the lower the value of minimum data path delay possible. Since a shorter minimum path delay may obviate or reduce the need for circuits added merely for the purpose of introducing delay, narrowing the clock pulse width tends to reduce the number of circuits in the data processing system.

Figure 4:
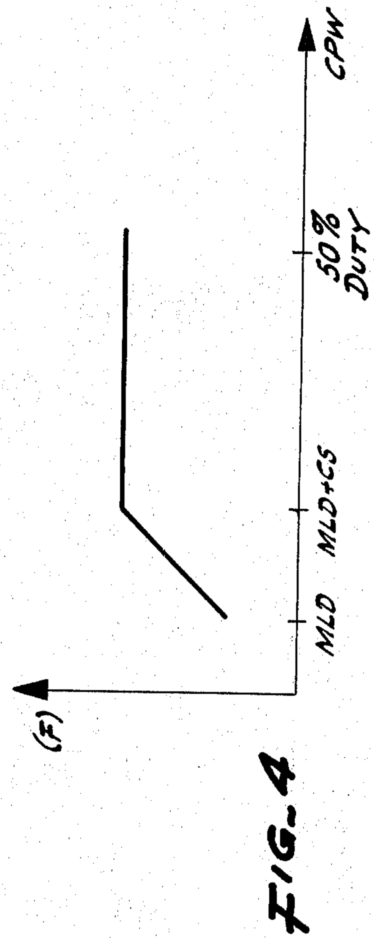
FIG. 4 depicts a graphical representation of the relationship between the frequency of the data processing system and the clock pulse width.

Referring to FIG. 4, a graph representing the relationship between the frequency F of operation of the data processing system versus the clock pulse width CPW is shown. The higher the frequency the greater the system performance. The greater the clock pulse width, the higher the minimum data path delay which generally increases the number of circuits and therefore the system cost. The graph starts with a clock pulse width equal to the maximum latch delay MLD since for pulse widths narrower than this the system will not operate properly because of race conditions and double-gating of data. The maximum permissable frequency of the data processing system increases up until a point where the pulse width is equal to the maximum latch delay plus the maximum clock skew, MLD + CS. An increase in pulse width beyond the MLD + CS value does not produce an attendant increase in frequency while there is an increase in the minimum data path delay Dmin. If the clock pulse width, in accordance with the present invention, is selected substantially equal to the MLD + CS, the data processing system can be operated at the maximum frequency with the fewest number of circuits. Operating the data processing system at a pulse width greater than the maximum latch delay MLD but less than MLD + CS also has an advantage of increasing the maximum permissible frequency for operating the data processing system which of course is beneficial. Furthermore, operating the data processing system with a pulse width in excess of the value MLD + CS ensures that the machine can always be operated at maximum frequency. For example, operating the data processing system at a clock pulse width CPW which is 10 percent greater than MLD + CS gives a 10 percent safety region which ensures that the data processing system will not operate lower than the maximum permissible frequency.

While the invention has been particularly shown and described with reference to preferred embodiments thereof, it will be understood by those skilled in the art that the foregoing and other changes in form and details may be made therein without departing from thr spirit and scope of the invention.

I CLAIM:

1. In a data processing system having a plurality of latch circuits for propagating data through data paths and for latching data from data paths under the control of clock signals from a clock apparatus, said clock signals having a clock skew equal to or less than a maximum clock skew and said latch circuits latching data within a period less than a maximum latch delay, the improvement comprising, clock apparatus means for generating clock signals of frequency F to define a cycle time CT equal to 1/F, wherein said maximum clock skew is CS, wherein said maximum latch delay is MLD, wherein said data paths have delays less than a maximum data path delay Dmax and greater than a minimum data path delay Dmin, and wherein said clock apparatus means further comprises means for generating said clock signals with a pulse width CPW exceeding MLD, with the sum of CPW and CS less than Dmin, and with CT greater than Dmax.

2. In a data processing system having a plurality of latch circuits for propagating data through data paths and for latching data from data paths under the control of clock signals from a clock apparatus, said clock signals having a clock skew equal to or less than a maximum clock skew and said latch circuits latching data within a period less than a maximum latch delay, the improvement comprising, clock apparatus means for generating clock signals of frequency F to define a cycle time CT equal to 1/F, wherein said maximum clock skew is CS, wherein said maximum latch delay is MLD, wherein said data paths have delays less than a maximum data path delay equal to Dmax, and wherein said clock apparatus means further comprises means for generating said clock signals with a pulse width exceeding CS+MLD and for generating said clock signals so that CT is greater than Dmax.

3. The apparatus of claim 2 wherein said clock apparatus means includes, a square wave generator for generating a square wave signal, a first path for receiving said square wave signal, a second path for receiving said square wave signal wherein said second path has a greater delay than said first path, means for logically combining the outputs of said first and second paths for generating said clock signals as rectangular wave signals with said pulse width greater than said maximum latch delay and including at least a portion of the clock skew.

4. The apparatus of claim 3 wherein said second path includes a plurality of logic gates and wherein said means for logical combining is a NOR gate.

5. In a data processing system having a plurality of storing circuits for storing input data signals under control of clock signals where said storing circuits operate with a delay less than a maximum delay MLD and having a plurality of data paths for propagating data signals between the storing circuits, the improvements comprising, a plurality of data paths interconnecting said storing circuits, each data path having a delay less than a maximum delay Dmax and greater than a minimum delay Dmin, means for generating clock signals of frequency F to define a cycle time CT equal to 1/F which exceeds Dmax and for distributing the clock signals to said storing circuits with a skew less than a maximum skew CS where the pulse width of said clock signals exceeds CS+MLD.

6. The data processing system of claim 5 wherein said means for generating clock signals includes, a square wave generator for generating a square wave signal, a first circuit path for receiving said square wave signal, a second circuit path for receiving said square wave signal wherein said second circuit path has a greater delay than said first circuit path, means for logically combining the outputs of said first and second circuit paths for generating said clock signals as rectangular wave signals with said pulse width greater than said maximum delay MLD and including at least a portion of the clock skew.

7. The data processing system of claim 5 wherein said storing circuits are threshold triggered devices.

8. The data processing system of claim 7 wherein said storing circuits are latch circuits which have a bi-stable output as a function of the threshold levels of data input signals and clock signals.

9. In a data processing system having a plurality of storing circuits for storing data signals within a time less than a maximum delay MLD and having a plurality of data paths interconnecting the storing circuits for propagating data signals between the storing circuits under the control of clock signals having a clock skew and wherein the data paths have data path delays less than a maximum delay Dmzx and greater than a minimum delay Dmin, the method comprising the steps of, generating clock signals of frequency F to define a cycle time CT equal to 1/F, said clock signals having a pulse width greater than MLD so as to include at least a portion of the clock skew and said clock signals having the cycle time CT greater than Dmax, distributing said clock signals with a clock skew less than a maximum clock skew CS to first and second storing circuits interconnect by a specific data path whereby a data signal is transferred from the first storing circuit through said data path to the second storing circuit.

10. The method of claim 9 wherein said clock signals are generated by the steps comprising, generating a square wave signal, distributing said square wave signal through a first circuit path, distributing said square wave signal through a second circuit path wherein said second circuit path has a greater delay than the delay of said first circuit path, logically combining the outputs of the first and second circuit paths thereby generating a rectangular wave clock signal with a pulse width greater than MLD and which includes at least a portion of the clock skew.

11. In a data processing system having a plurality of storing circuits for storing data signals within a time less than a maximum delay MLD and having a plurality of data paths interconnecting the storing circuits for propagating data signals between the storing circuits under the control of clock signals having a clock skew less than a maximum clock skew CS, said data paths having data path delays less than a maximum delay Dmax and gerater than a minimum delay Dmin, the improvement comprising the steps of, generating clock signals of frequency F to define a cycle time CT equal to 1/F, said clock signals generated with a pulse width CPW greater than MLD, with CT greater than Dmax, and with CPW+CS less than Dmin, distributing said clock signals with a clock skew less than CS to first and second storing circuits interconnected by a specific data path whereby a data signal is transferred from the first storing circuit through said data path to the second storage circuit.

12. In a data processing system having a plurality of threshold latch circuits for propagating data through data paths and for lathcing data from data paths under the control of clock signals from a clock apparatus, said clock signals having a clock skew equal to or less than a maximum clock skew and said latch circuits latching data within a period less than a maximum latch delay, the improvement comprising, clock apparatus means for generating clock signals of frequency F to define a cycle time CT equal to 1/F, wherein said maximum clock skew is CS, wherein said maximum latch delay is MLD, wherein said data paths have delays less than a maximum data path delay Dmax and greater than a minimum data path delay Dmin, and wherein said clock apparatus means further comprises means for generating said clock signals with a pulse width pw substantially equal to CS+MLD, with CPW+CS less than Dmin, and with CT greater than Dmax whereby said system is substantially operable at the highest clock frequency.

13. In a data processing system having a plurality of threshold latch circuits for propagating data through data paths and for latching data from data paths under the control of clock signals from a clock apparatus, said clock signals having a clock skew equal to or less than a maximum clock skew and said latch circuits latching data within a period less than a maximum latch delay, the improvement comprising, clock apparatus means for generating clock signals of frequency F to define a cycle time CT equal to 1/F, wherein said maximum clock skew is CS, wherein said maximum latch delay is MLD, wherein said data paths have delays less than a maximum data path delay Dmax and greater than a minimum data path delay Dmin, and wherein said clock apparatus means further comprises means for generating said clock signals with a pulse width CPW exceeding MLD+CS, with CPW+CS less than Dmin, and with CT greater than Dmax whereby said system is operable at the highest clock frequency.

* * * * *

PO-1050
(5/69)

UNITED STATES PATENT OFFICE
CERTIFICATE OF CORRECTION

Patent No. 3,792,362 Dated February 12, 1974

Inventor(s) GLENN D. GRANT

It is certified that error appears in the above-identified patent and that said Letters Patent are hereby corrected as shown below:

IN THE CLAIMS:

Claim 9, column 11, line 49, cancel "Dmzx" and substitute therefor --Dmax--.

Claim 11, column 12, line 17, cancel "gerater" and substitute therefor --greater--.

Claim 12, column 12, line 31, cancel "lathcing" and substitute therefor --latching--.

Claim 12, column 12, line 44, cancel "pw" and substitute therefor --CPW--.

Signed and sealed this 21st day of May 1974.

(SEAL)
Attest:

EDWARD M. FLETCHER, JR.
Attesting Officer

C. MARSHALL DANN
Commissioner of Patents